US009819169B2

(12) United States Patent
Shiraki (10) Patent No.: US 9,819,169 B2
(45) Date of Patent: Nov. 14, 2017

(54) ELECTRICAL JUNCTION BOX

(71) Applicant: Sumitomo Wiring Systems, Ltd., Yokkaichi, Mie (JP)

(72) Inventor: Takashi Shiraki, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/327,929

(22) PCT Filed: Jul. 2, 2015

(86) PCT No.: PCT/JP2015/069185
§ 371 (c)(1),
(2) Date: Jan. 20, 2017

(87) PCT Pub. No.: WO2016/013375
PCT Pub. Date: Jan. 28, 2016

(65) Prior Publication Data
US 2017/0201079 A1    Jul. 13, 2017

(30) Foreign Application Priority Data
Jul. 23, 2014   (JP) .................................. 2014-150179

(51) Int. Cl.
*H02G 3/16*    (2006.01)
*H02G 3/08*    (2006.01)
(Continued)

(52) U.S. Cl.
CPC ............... *H02G 3/16* (2013.01); *B60R 16/02* (2013.01); *H02G 3/081* (2013.01); *H02G 3/088* (2013.01); *H02G 3/14* (2013.01)

(58) Field of Classification Search
CPC ............ H02G 3/16; H02G 3/081; H02G 3/14; H02G 3/088; B60R 16/02
See application file for complete search history.

(56) References Cited

U.S. PATENT DOCUMENTS 5,471,012 A * 11/1995 Opel ..................... H02G 3/16
174/53
7,034,222 B1 * 4/2006 York ..................... H02G 3/16
174/50
(Continued)

FOREIGN PATENT DOCUMENTS

JP    H11122751 A    4/1999
JP    2012055108 A    3/2012
(Continued)

OTHER PUBLICATIONS

International Search Report and Written Opinion for Application No. JP2015/069185. 8 pages.
(Continued)

*Primary Examiner* — Dhirubhai R Patel
(74) *Attorney, Agent, or Firm* — Reising Ethington, P.C.

(57) ABSTRACT

An electrical junction box with a waterproof property where a box body and a lower cover are fitted to each other is provided. An electrical junction box includes a box body having a peripheral wall formed in a frame shape and a lower cover with which a lower opening portion of the box body is covered. A lower end portion of the peripheral wall is provided with a double wall portion in which an inner wall and an outer wall extending in a peripheral direction are arranged with a clearance therebetween. An insertion wall portion provided on a tip end portion of a peripheral wall of the lower cover is inserted between the inner wall and the outer wall. In such an electrical junction box, a flange portion that projects toward the outer wall is provided on a projecting end portion of the insertion wall portion of the lower cover.

2 Claims, 7 Drawing Sheets

(51) Int. Cl.
*H02G 3/14* (2006.01)
*B60R 16/02* (2006.01)

(56) References Cited

U.S. PATENT DOCUMENTS

| | | | |
|---|---|---|---|
| 9,705,233 B2 * | 7/2017 | Yamada | ............... H02G 3/16 |
| 2013/0032371 A1 | 2/2013 | Makino | |
| 2015/0245505 A1 | 8/2015 | Anami | |

FOREIGN PATENT DOCUMENTS

| | | |
|---|---|---|
| JP | 2013034320 A | 2/2013 |
| JP | 2014075916 A | 4/2014 |

OTHER PUBLICATIONS

English Translation of International Search Report for Application No. JP2015/069185. 1 page.

* cited by examiner

ELECTRICAL JUNCTION BOX

CROSS REFERENCE TO RELATED APPLICATIONS

This application claims the priority of Japanese patent application JP2014-150179 filed on Jul. 23, 2014, the entire contents of which are incorporated herein.

TECHNICAL FIELD

The present invention relates to an electrical junction box to be mounted in an automobile or the like, and particularly to an electrical junction box having a waterproof structure with which infiltration of water from the outside is prevented.

BACKGROUND ART

Conventionally, electrical junction boxes to be mounted in automobiles and the like are configured to include a box body that has a peripheral wall formed in a frame shape and keeps electric parts such as a relay, a fuse, and an electric wire installed inside the peripheral wall, and lid bodies such as an upper cover and a lower cover with which opening portions on the upper and lower sides of the box body are covered. For example, electrical junction boxes are configured as disclosed in JP 2012-55108A (Patent Document 1).

In Patent Document 1, a double wall portion, in which an inner wall and an outer wall extending in a peripheral direction are arranged with a clearance therebetween, is provided at the opening end portion on the lower side of the peripheral wall of the box body to which the lower cover is to be attached. An insertion wall portion provided at the tip end portion of the peripheral wall of the lower cover is inserted between the inner wall and the outer wall in this double wall portion in a close contact manner, and thus the lower cover is attached to the lower opening portion of the box body. Accordingly, even when the electrical junction box mounted in a vehicle is splashed with water, a route through which the water infiltrates from the outside into the inside of the electrical junction box becomes complicated due to the double wall portion and the insertion wall portion overlapping each other, and therefore, the water is advantageously prevented from infiltrating into the inside of the electrical junction box through the portion where the box body and the lower cover are fitted to each other.

However, in such an electrical junction box having a conventional structure, the double wall portion and the insertion wall portion overlap each other in a close contact manner, and therefore, there are cases where water infiltrates into the inside of the electrical junction box by capillary action through minute clearances formed between the contact surfaces of the inner wall and outer wall in the double wall portion and the contact surfaces of the insertion wall portion. Accordingly, there is still room for improvement.

SUMMARY OF INVENTION

The present design has been achieved in light of the aforementioned circumstances, and the problem to be solved by the present invention is to provide an electrical junction box having a novel structure with which a waterproof property can be more reliably secured in a portion where the box body and the lower cover are fitted to each other.

A first aspect of the present design is an electrical junction box including a box body having a peripheral wall formed in a frame shape, and a lower cover with which a lower opening portion of the box body is covered, a lower end portion of the peripheral wall of the box body being provided with a double wall portion in which an inner wall and an outer wall extending in a peripheral direction are arranged with a clearance therebetween, an insertion wall portion provided on a tip end portion of a peripheral wall of the lower cover being arranged by being inserted between the inner wall and the outer wall, wherein a flange portion that projects toward the outer wall is provided on a projecting end portion of the insertion wall portion of the lower cover.

With this aspect, the flange portion projecting toward the outer wall is provided at the projecting end portion of the insertion wall portion of the lower cover to be inserted between the inner wall and the outer wall constituting the double wall portion of the box body. Accordingly, when the insertion wall portion is inserted into the clearance in the double wall portion, a clearance corresponding to the flange portion in which capillary action does not occur is formed between the outer wall included in the double wall portion and the insertion wall portion. Therefore, even when a vicinity of the portion where the box body and the lower cover are fitted to each other is splashed with water, it is possible to eliminate or reduce a risk that water infiltrates into the inside of the electrical junction box by capillary action through the minute clearance between the double wall portion and the insertion wall portion.

Furthermore, the flange portion is provided to project toward the outer wall, and therefore, even if water enters the clearance between the outer wall in the double wall portion and the insertion wall portion, the water is advantageously prevented from passing the flange portion and moving into a portion between the insertion wall portion and the inner wall. That is, since the water moves to the outer wall side along the wall surface of the flange portion, drops downward along the outer wall, and is drained, the water can be advantageously prevented from infiltrating into the inside of the electrical junction box. It should be noted that the lower side of the box body refers to a vertically lower side in a state in which the electrical junction box is arranged.

A second aspect of the present design is the electrical junction box according to the first aspect, wherein a cover wall portion that surrounds the insertion wall portion from an outer peripheral side is arranged at a tip end portion of the peripheral wall of the lower cover so as to be separated from the insertion wall portion toward the outer peripheral side, and the cover wall portion is supported on the peripheral wall via a connecting portion that is provided between the cover wall portion and the peripheral wall, and in a state in which the box body and the lower cover are fitted to each other, a projecting end surface of the outer wall in the double wall portion is brought into contact with a projecting end surface of the cover wall portion, and the flange portion of the insertion wall portion projects toward the box body side beyond a projecting end surface of the cover wall portion.

With this aspect, the cover wall portion is provided on the outer peripheral side with respect to the insertion wall portion of the lower cover, and the outer wall in the double wall portion of the box body is brought into contact with the projecting end surface of the cover wall portion. Accordingly, a portion between the contact surfaces of the lower cover and the contact surface of the outer wall in the double wall portion of the box body, into which water first infiltrates from the outside when the electrical junction box is splashed with water, can be provided on the outer peripheral side so as to be separated from the insertion wall portion, thus making it possible to advantageously prevent the water from directly reaching the insertion wall portion.

Furthermore, since the flange portion of the insertion wall portion projects toward the box body side, that is, upward, with respect to the portion between the contact surfaces, the action of gravity makes it more difficult for water to pass the insertion wall portion, thus making it possible to further improve the waterproof property of the electrical junction box.

A third aspect of the present design is the electrical junction box according to the first or second aspect, wherein a paired locking mechanism with which the box body and the lower cover are fitted and locked to each other includes a locking portion provided on the double wall portion of the box body and a locked portion provided to project upward from the peripheral wall of the lower cover, the locking portion is configured to include an accommodating space that is formed between the inner wall and the outer wall, and an open window that is open in the outer wall and through which the accommodating space is in communication with the outside, the locked portion includes an elastic projecting piece and an engaging projection portion that is provided on an outer surface of a projecting tip end portion of the elastic projecting piece, and when the elastic projecting piece of the locked portion is inserted into the accommodating space, the engaging projection portion comes into contact with the outer wall and is bent and deformed, allowing the elastic projecting piece to be inserted into the accommodating space, and when the engaging projection portion reaches the open window and the elastic projecting piece is elastically restored, the engaging projection portion is engaged with a peripheral edge of the open window, so that the box body and the lower cover are fitted and locked to each other with the locking mechanism.

With this aspect, the accommodating space constituting the locking portion is formed by using the clearance between the inner wall and the outer wall in the double wall portion, and the box body and the lower cover are locked and fitted to each other by fitting the elastic projecting piece included in the locked portion into the accommodating space. Accordingly, the locking mechanism can be arranged with good space efficiency using the clearance in the double wall portion, and thus the locking mechanism can be provided while also achieving the reduction in size of the electrical junction box.

With the electrical junction box according to the present design, the flange portion projecting toward the outer wall is provided on the projecting end portion of the insertion wall portion of the lower cover to be inserted between the inner wall and the outer wall constituting the double wall portion of the box body. Accordingly, a clearance corresponding to the flange portion in which capillary action does not occur is formed between the outer wall included in the double wall portion and the insertion wall portion. Therefore, even when a vicinity of the portion where the box body and the lower cover are fitted to each other is splashed with water, it is possible to eliminate or reduce a risk that water infiltrates into the inside of the electrical junction box by capillary action through the minute clearance between the double wall portion and the insertion wall portion. Furthermore, the flange portion is provided to project toward the outer wall, and therefore, even if water enters the clearance between the outer wall in the double wall portion and the insertion wall portion, the water moves to the outer wall side along the wall surface of the flange portion, drops downward along the outer wall, and is drained, thus making it possible to advantageously prevent the water from infiltrating into the inside of the electrical junction box.

DESCRIPTION OF EMBODIMENTS

Hereinafter, an embodiment of the present design will be described with reference to the drawings.

FIGS. 1 to 8 show an electrical junction box 10 according to an embodiment. The electrical junction box 10 is arranged at an appropriate position in a vehicle (not shown) such as an automobile and has a function for distributing electric power supplied by a battery to vehicle-mounted electrical components such as a motor and a lamp. It should be noted that the electrical junction box 10 is mounted in a vehicle such that the up-down direction in FIG. 1 corresponds to the vertical direction. In the description below, unless otherwise stated, the up-down direction refers to the up-down direction in FIG. 1, the longitudinal direction and the front-rear direction refer to the up-down direction in FIG. 4, and the width direction refers to the left-right direction in FIG. 4.

More specifically, the electrical junction box 10 is configured to include a box body 12, a lower cover 16 with which a lower opening portion 14 of the box body 12 is covered, and an upper cover (not shown) with which an upper opening portion 18 of the box body 12 is covered. The box body 12, the lower cover 16, and the upper cover are each integrally formed of a synthetic resin made of polypropylene (PP), polyamide (PA), or the like by injection molding or the like, for example.

Figure 5:
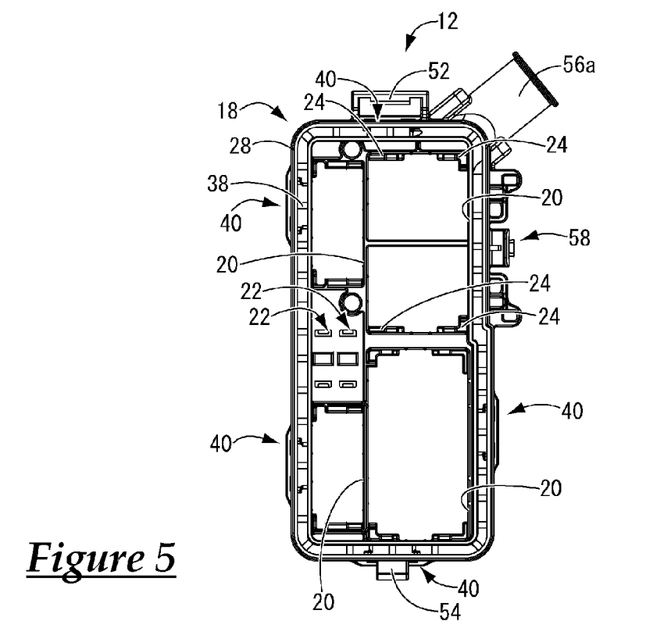
FIG. 5 is a plan view of the box body shown in FIG. 4.
Figure 6:
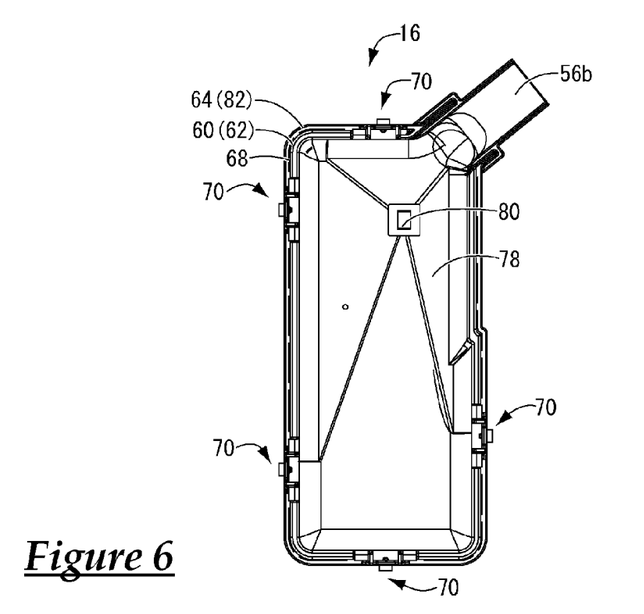
FIG. 6 is a plan view of the lower cover shown in FIG. 4.

The box body 12 has an elongated rectangular frame body shape as a whole, and as shown in FIG. 5, on the upper opening portion 18 side of the box body 12, a plurality of relay block attaching portions 20 having a substantially rectangular shape in a planar view are provided, and a plurality of connector attaching portions 22 are formed to be open upward. Relay block holding projections 24 that project inward are provided at the corners of the lower end portion of the relay block attaching portion 20 along the inner periphery, so that the back surface of a relay block (not shown) attached to the relay block attaching portion 20 can be positioned and held. On the other hand, electric wires (not shown) connected to the relay blocks (not shown) that have been attached to the relay block attaching portions 20 and connectors (not shown) that have been attached to the connector attaching portions 22 are arranged on the lower opening portion 14 side of the box body 12. It should be noted that these electric wires are drawn out to the outside through a later-described electric wire leading hole 56 and connected to the vehicle-mounted electrical components, the battery, and the like.

Figure 3:
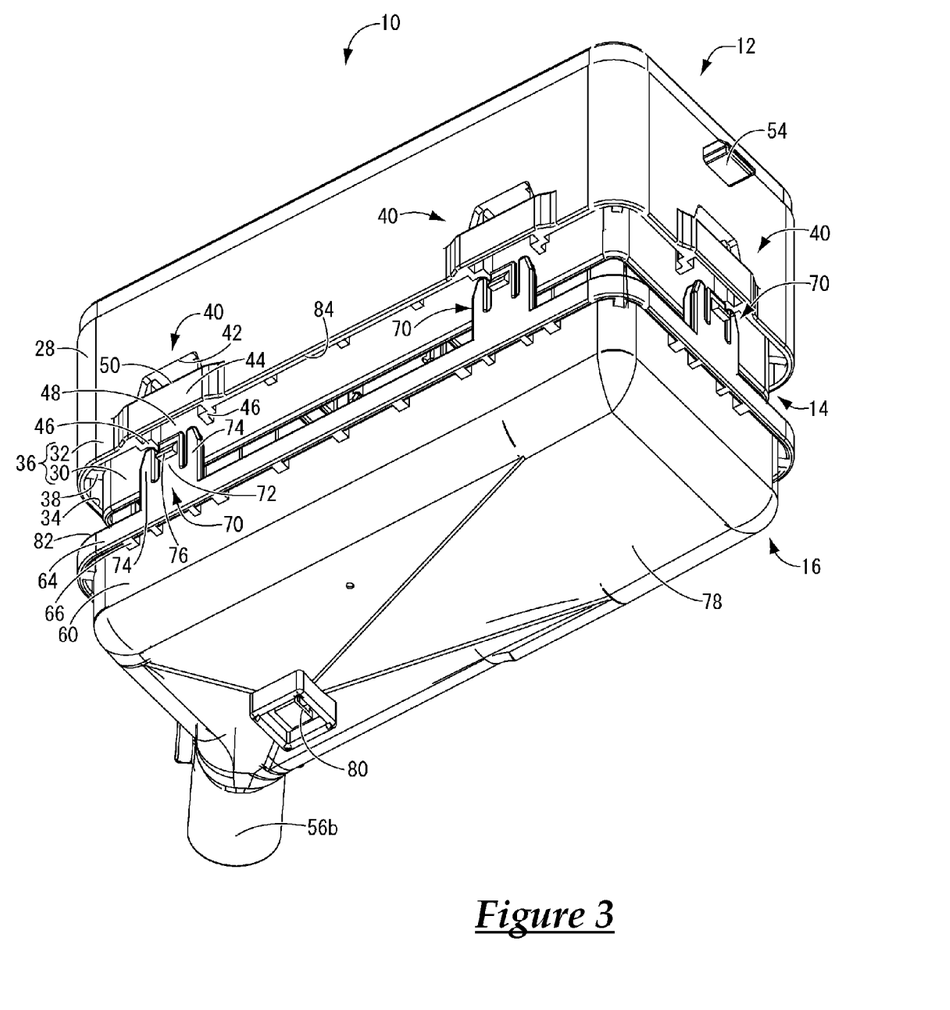
FIG. 3 is an exploded perspective view of the electrical junction box shown in FIG. 2, as viewed obliquely from the bottom surface side.
Figure 4:
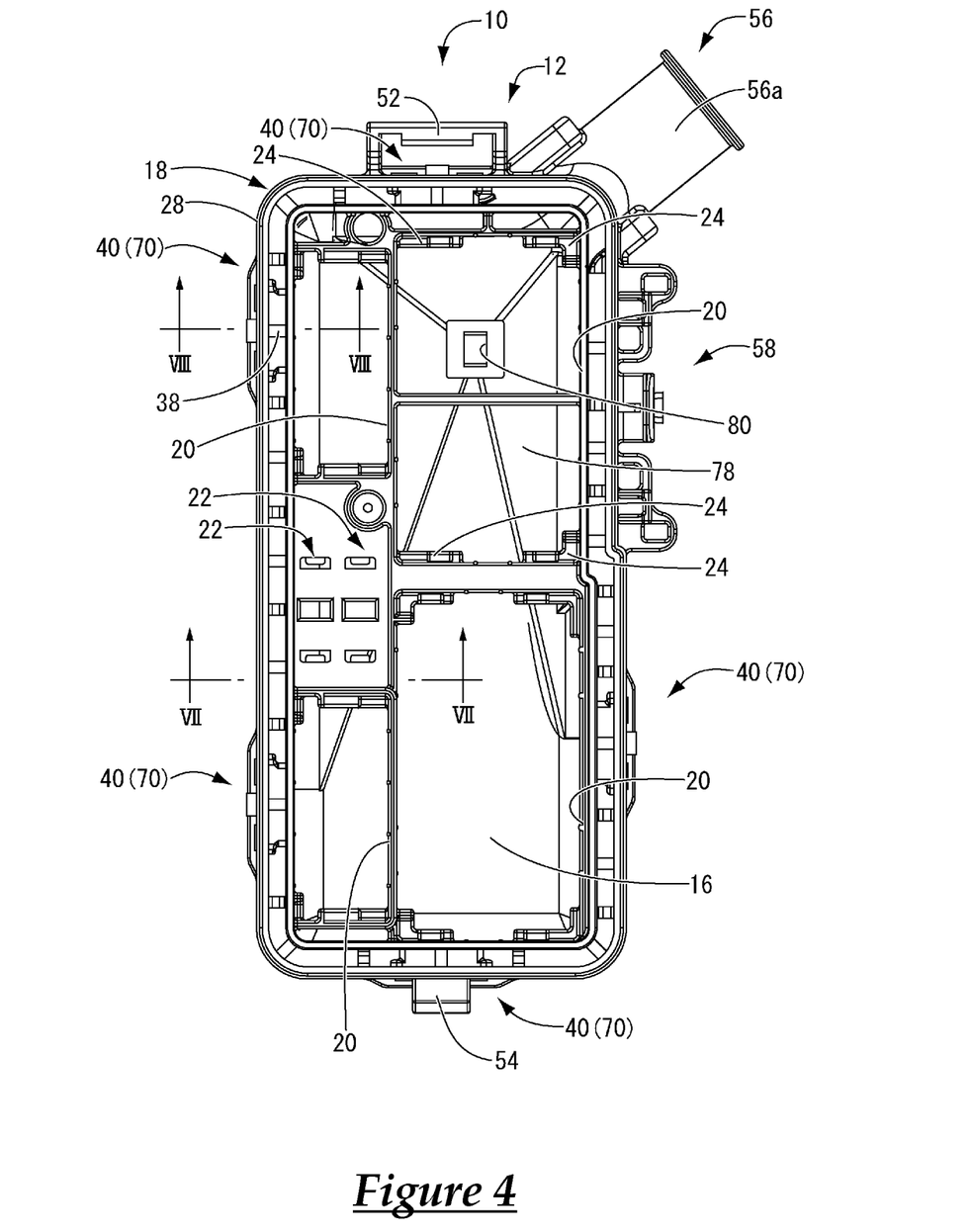
FIG. 4 is a plan view of the electrical junction box shown in FIG. 1.

The box body 12 has a peripheral wall 28 formed in a frame shape, and as shown in FIG. 3, a double wall portion 36, in which an inner wall 30 and an outer wall 32 extending in a peripheral direction are arranged with a clearance 34 therebetween, is provided at the lower end portion of the peripheral wall 28 of the box body 12. The inner wall 30 and the outer wall 32 are integrally connected via connecting portions 38 provided between the inner wall 30 and the outer wall 32. It should be noted that in this embodiment, the inner wall 30 is formed to project further toward the lower cover 16 side than the outer wall 32 does.

Locking portions 40 are provided at a plurality of positions that are separated from each other in the peripheral direction in the double wall portion 36 at the lower end portion of the peripheral wall 28 of the box body 12. As shown in FIG. 3, the locking portions 40 each include a cut-out portion 42 formed by cutting out the outer wall 32 in a substantially rectangular shape near the lower end portion of the box body 12, a bridge portion 44 that connects portions of the outer wall 32 at the lower end portion of the cut-out portion 42 and has a U shape in a bottom view, and guide portions 46 having a crank shape in a bottom view that are formed at the two end portions of the cut-out portion 42 and connect the inner wall 30 and the outer wall 32. That is, the locking portion 40 is configured to include an accommodating space 48 that is formed between the outer peripheral surfaces of the inner wall 30 and the outer wall 32 in the double wall portion 36 by forming the cut-out portion 42 and an open window 50 that is open in the outer wall 32 and through which the accommodating space 48 is in communication with the outside.

With regard to two parts of the peripheral wall 28 that are opposed to each other in the longitudinal direction (left-right direction in FIG. 1) of the box body 12, a locking frame body 52 having a U shape in a planar view and projecting outward is provided on a portion near the upper opening portion 18 of the box body 12 in one of the two parts, and a locking projection 54 having a substantially rectangular block shape and projecting outward is provided on a portion near the upper opening portion 18 of the box body 12 in the other of the two parts. The locking frame body 52 and the locking projection portion 54 are fitted to a locking projection portion and a locking frame body of the upper cover (not shown), respectively, and thus the upper opening portion 18 of the box body 12 can be maintained in a state in which the upper opening portion 18 is covered with the upper cover.

Furthermore, a lock fitting portion 58 to be attached to a fixing bracket (not shown) projects from the outer peripheral surface of one (on the right side in FIG. 4) of two parts of the peripheral wall 28 that are opposed to each other in the width direction of the box body 12, and the electrical junction box 10 is stably held at a predetermined position in a vehicle by fitting the lock fitting portion 58 to the fixing bracket (not shown). In addition, an electric wire leading hole 56a that projects outward (toward the obliquely right front side in FIGS. 4 and 5) is provided near the lower opening portion 14 in the part of the peripheral wall 28 of the box body 12 to which the locking frame body 52 is provided. It should be noted that the electric wire leading hole 56a is formed in a semicylindrical shape that is convex upward.

The lower cover 16 has a box body shape that is open upward (see FIG. 2), and includes a bottom wall 78 having an elongated rectangular shape that is substantially the same as the shape of the lower opening portion 14 of the box body 12 in a planar view, and a peripheral wall 60 projecting upward from the outer peripheral edge of the bottom wall 78. An insertion wall portion 62 is provided to project from the tip end portion of the peripheral wall 60 of the lower cover 16, and a cover wall portion 64 is provided to surround the insertion wall portion 62 from the outer peripheral side. That is, as shown in FIG. 3, the cover wall portion 64 is arranged so as to be separated from the insertion wall portion 62 toward the outer peripheral side, and the cover wall portion 64 is supported on the peripheral wall 60 using a plurality of connecting portions 66 that are provided between the cover wall portion 64 and the peripheral wall 60 and arranged so as to be separated from each other in the peripheral direction of the peripheral wall 60. In addition, the projecting end portion of the insertion wall portion 62 of the lower cover 16 is provided with a flange portion 68 that projects outward, that is, toward the outer wall 32 in the later-described state in which the box body 12 and the lower cover 16 are fitted to each other (see FIGS. 2 and 7).

Figure 1:
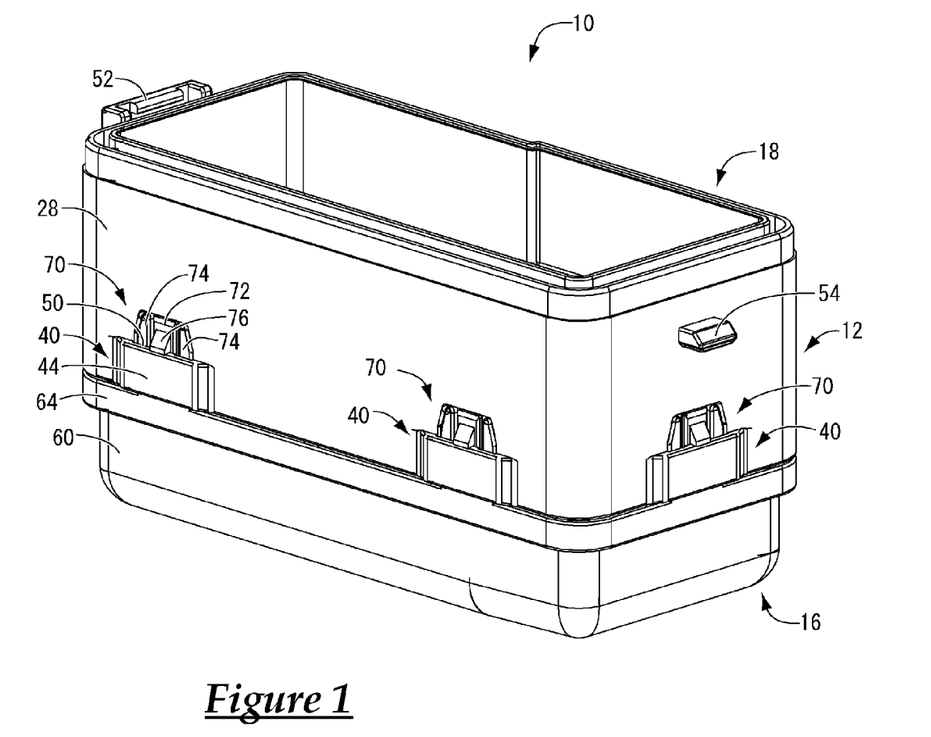
FIG. 1 is a perspective view of an electrical junction box according to an embodiment (in a state in which a box body and a lower cover are fitted to each other).
Figure 2:
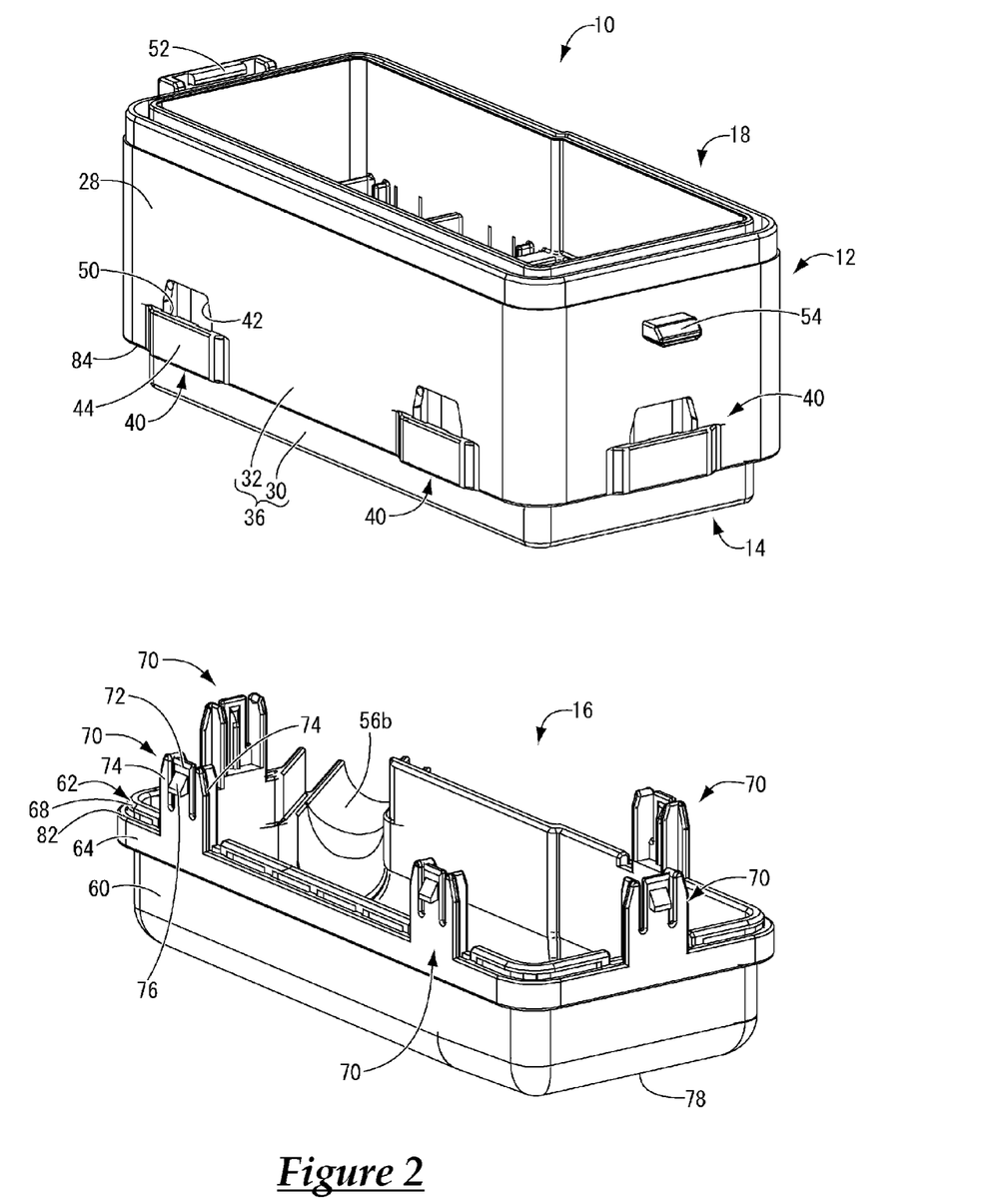
FIG. 2 is an exploded perspective view of the electrical junction box shown in FIG. 1.

At the tip end portion of the peripheral wall 60 of the lower cover 16, locked portions 70 are provided to project upward at a plurality of positions corresponding to the locking portions 40 provided on the box body 12. More specifically, as shown in FIG. 2, the locked portions 70 each include an elastic projecting piece 72 having a substantially rectangular flat plate shape that is provided to project upward from the upper end portion of the cover wall portion 64 of the lower cover 16, and a pair of guide plate portions 74 having a substantially L-shaped cross section that are provided on the two sides of the elastic projecting piece 72 so as to extend over the cover wall portion 64 and the peripheral wall 60 and project therefrom. An engaging projection portion 76 that has a substantially triangular cross section and projects outward is provided on the outer surface of the projecting tip end portion of the elastic projecting piece 72, and the elastic projecting piece 72 and the pair of guide plate portions 74 are connected to each other at their base end portions.

In addition, an electric wire leading hole 56b that projects outward (toward the obliquely right front side in FIG. 6) is provided on the peripheral wall 60 of the lower cover 16 at the position corresponding to the electric wire leading hole 56a provided to the box body 12. The electric wire leading hole 56b is formed in a semicylindrical shape that is convex downward, and in the later-described state in which the box body 12 and the lower cover 16 are fitted to each other, the electric wire leading hole 56a of the box body 12 and the electric wire leading hole 56b are assembled into an electric wire leading hole 56 having a cylindrical shape (see FIG. 4). Moreover, as shown in FIG. 3, the bottom wall 78 of the lower cover 16 is formed to be inclined downward toward a drainage hole 80 that has a substantially rectangular cross section and is provided to penetrate the bottom wall 78. Accordingly, even when water infiltrates into the inside of the electrical junction box 10, the quick drainage of the water through the drainage hole 80 is secured.

When the lower cover 16 configured in this manner is assembled to the lower opening portion 14 of the box body 12, as shown in FIG. 3, the pair of guide plate portions 74 having a substantially L-shaped cross section that are provided on the locked portion 70 of the lower cover 16 are inserted toward the accommodating space 48 configured at the lower end portion of the box body 12 along the pair of guide portions 46 provided to the box body 12. When the lower cover 16 is further pushed toward the box body 12 side, that is, the elastic projecting piece 72 of the locked portion 70 is inserted into the accommodating space 48, the engaging projection portion 76 of the elastic projecting piece 72 comes into contact with the bridge portion 44 connected to the outer wall 32 of the box body 12 and is bent and deformed inward, and thus the elastic projecting piece 72 is allowed to be further inserted into the accommodating space 48. Subsequently, when the engaging projection portion 76 passes the bridge portion 44 and reaches the open window 50 so that the elastic projecting piece 72 is elastically restored, the engaging projection portion 76 is engaged with the peripheral edge of the open window 50, and thus the box body 12 and the lower cover 16 are fitted and locked to each other with a locking mechanism. In this manner, in this embodiment, the paired locking mechanism with which the box body 12 and the lower cover 16 are fitted and locked to each other includes the locking portion 40 provided on the box body 12 and the locked portion 70 provided on the lower cover 16.

Figure 7:
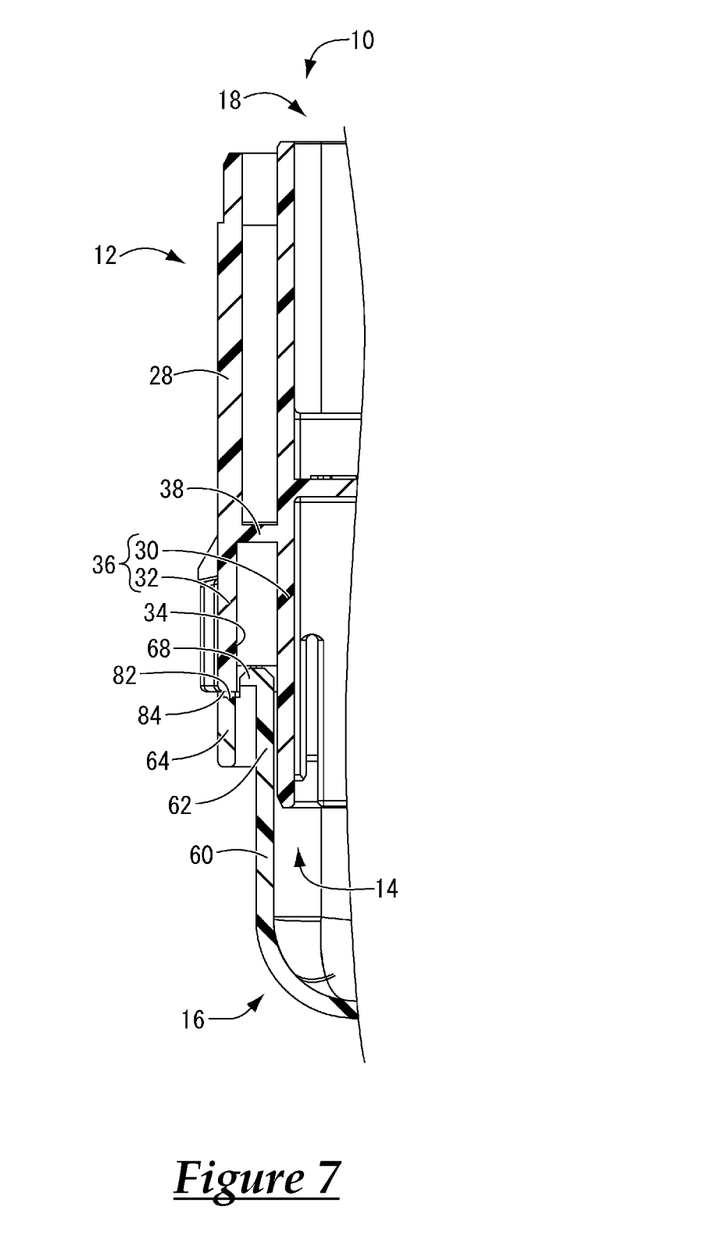
FIG. 7 is an enlarged cross-sectional view taken along line VII-VII in FIG. 4.
Figure 8:
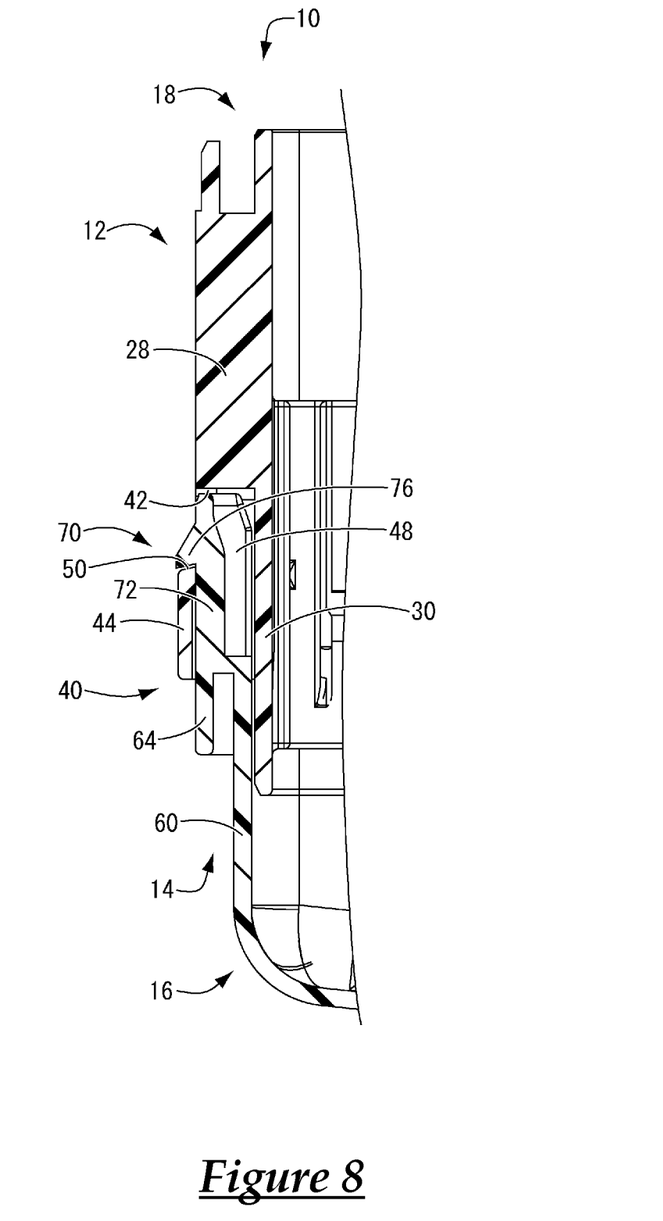
FIG. 8 is an enlarged cross-sectional view taken along line VIII-VIII in FIG. 4.

In the state in which the box body 12 and the lower cover 16 are fitted to each other, as shown in FIG. 7, the insertion wall portion 62 of the lower cover 16 is arranged by being inserted between the inner wall 30 and the outer wall 32 of the box body 12. Furthermore, a projecting end surface 84 of the outer wall 32 in the double wall portion 36 of the box body 12 is brought into contact with a projecting end surface 82 of the cover wall portion 64 of the lower cover 16, and the flange portion 68 of the insertion wall portion 62 of the lower cover 16 is configured to project toward the box body 12 side beyond the projecting end surface 82 of the cover wall portion 64 in this state.

With the electrical junction box 10 according to this embodiment configured to have this structure, in the state in which the box body 12 and the lower cover 16 are fitted to each other, the insertion wall portion 62 of the lower cover 16 is inserted between the inner wall 30 and the outer wall 32 constituting the double wall portion 36 of the box body 12, and the flange portion 68 projecting toward the outer wall 32 is provided to the projecting end portion of the insertion wall portion 62. Accordingly, a clearance corresponding to the projection dimension of the flange portion 68 in which capillary action does not occur is formed between the outer wall 32 and the insertion wall portion 62. Therefore, even when a vicinity of the portion where the box body 12 and the lower cover 16 are fitted to each other is splashed with water, it is possible to eliminate or reduce a risk that water infiltrates into the inside of the electrical junction box by capillary action through the minute clearance between the double wall portion and the insertion wall portion as in a conventional manner.

Furthermore, the cover wall portion 64 is provided to surround the insertion wall portion 62 of the lower cover 16 from the outer peripheral side, and the projecting end surface 84 of the outer wall 32 in the double wall portion 36 of the box body 12 is brought into contact with the projecting end surface 82 of the cover wall portion 64. Accordingly, a portion between the projecting end surfaces 82 and 84 that are respectively the contact surfaces of the lower cover 16 and the box body 12, into which water first infiltrates from the outside when the electrical junction box 10 is splashed with water, can be provided on the outer peripheral side so as to be separated from the insertion wall portion 62, thus making it possible to advantageously prevent the water from directly reaching the insertion wall portion 62. Furthermore, clearances are formed in the peripheral direction of the peripheral wall 60 of the lower cover 16 between the connecting portions 66 connecting the cover wall portion 64 to the peripheral wall 60. Therefore, if water infiltrates through the portion between the projecting end surfaces 82 and 84, the water can also be quickly drained through the clearances between the connecting portions 66.

Moreover, since the flange portion 68 of the insertion wall portion 62 projects toward the box body 12 side, that is, upward, with respect to the portion between the projecting end surfaces 82 and 84, the action of gravity makes it more difficult for water to pass the insertion wall portion 62, thus making it possible to further improve the waterproof property of the electrical junction box 10.

In addition, the accommodating space 48 constituting the locking portion 40 is formed by using the clearance 34 between the inner wall 30 and the outer wall 32 in the double wall portion 36, and the box body 12 and the lower cover 16 are locked and fitted to each other by fitting the locked portion 70 into the accommodating space 48. Accordingly, the locking mechanism including the locking portion 40 and the locked portion 70 can be arranged with good space efficiency using the clearance 34 between the inner wall 30 and the outer wall 32 in the double wall portion 36, and thus the locking mechanism can be configured while also achieving the reduction in size of the electrical junction box 10.

Although the embodiment has been described in detail, the present invention is not limited to the specific description. For example, there is no particular limitation on the arrangement positions and the specific shapes of the locking portion 40 and the locked portion 70, which are included in the locking mechanism, and their arrangement positions and shapes can be set as desired considering the arrangement space of the electrical junction box 10 and the like.

REFERENCE SIGNS LIST

10: electrical junction box; 12: box body; 14: lower opening portion; 16: lower cover; 28: peripheral wall (box body); 30: inner wall; 32: outer wall; 34: clearance; 36: double wall portion; 38: connecting portion; 40: locking portion; 48: accommodating space; 50: open window; 60: peripheral wall (lower cover); 62: insertion wall portion; 64: cover wall portion; 66: connecting portion; 68: flange portion; 70: locked portion; 72: elastic projecting piece; 76: engaging projection portion; 82: projecting end surface (cover wall portion); 84: projecting end surface (double wall portion).

The invention claimed is:

1. An electrical junction box comprising:
a box body having a peripheral wall formed in a frame shape; and
a lower cover with which a lower opening portion of the box body is covered,
a lower end portion of the peripheral wall of the box body being provided with a double wall portion in which an inner wall and an outer wall extending in a peripheral direction are arranged with a clearance therebetween,
an insertion wall portion provided on a tip end portion of a peripheral wall of the lower cover being arranged by being inserted between the inner wall and the outer wall,
wherein a flange portion that projects toward the outer wall is provided on a projecting end portion of the insertion wall portion of the lower cover,
wherein a cover wall portion that surrounds the insertion wall portion from an outer peripheral side is arranged at the tip end portion of the peripheral wall of the lower cover so as to be separated from the insertion wall portion toward the outer peripheral side, and the cover wall portion is supported on the peripheral wall via a connecting portion that is provided between the cover wall portion and the peripheral wall, the connecting portion is mounted to the cover wall portion, and in a state in which the box body and the lower cover are fitted to each other, a projecting end surface of the outer wall in the double wall portion is brought into contact with a projecting end surface of the cover wall portion, and the flange portion of the insertion wall portion projects toward the box body side beyond the projecting end surface of the cover wall portion.

2. The electrical junction box according to claim 1, wherein a paired locking mechanism with which the box body and lower cover are fitted and locked to each other includes a locking portion provided on the outer wall of the double wall of portion of the box body and a locked portion provided to project upward from the peripheral wall of the lower cover, the locking portion is configured to include an accommodating space that is formed between the inner wall and the outer wall in the double wall portion, and an open window that is open in the outer wall and through which the accommodating space is in communication with outside of the electrical junction box, the locked portion includes an elastic projecting piece and an engaging projection portion that is provided on an outer surface of a projecting tip end portion of the elastic projecting piece, and when the elastic projecting piece of the locked portion is inserted into the accommodating space, the engaging projection portion comes into contact with the outer wall and is bent and deformed, allowing the elastic projecting piece to be inserted into the accommodating space, and when the engaging projection portion reaches the open window and the elastic projecting piece is elastically restored, the engaging projection portion is engaged with a peripheral edge of the open window, so that the box body and the lower cover are fitted and locked to each other with the paired locking mechanism.

* * * * *